United States Patent [19]

Benton

[11] 4,272,476
[45] Jun. 9, 1981

[54] MANUFACTURE OF BALL NUT WITH INTERNAL CROSSOVER PATH FOR BALL RECIRCULATION

[75] Inventor: Robert L. Benton, Bay City, Mich.

[73] Assignee: General Motors Corporation, Detroit, Mich.

[21] Appl. No.: 92,432

[22] Filed: Nov. 7, 1979

[51] Int. Cl.$^3$ .............................................. B29C 1/02
[52] U.S. Cl. .................................... 264/225; 74/459; 264/220; 264/227
[58] Field of Search ............... 264/220, 225, 226, 227; 74/459; 10/72 R

[56] References Cited

U.S. PATENT DOCUMENTS

| | | | |
|---|---|---|---|
| 3,961,541 | 6/1976 | Fund et al. | 74/459 |
| 4,070,921 | 1/1978 | Arnold | 74/459 |
| 4,148,226 | 4/1979 | Benton | 74/459 |

Primary Examiner—Donald E. Czaja
Assistant Examiner—W. Thompson
Attorney, Agent, or Firm—Charles R. White

[57] ABSTRACT

A ball nut and screw assembly is provided with a molded internal return system for a train of balls drivingly interconnecting the nut and screw. A ball nut with an internal crossover is used as a master mold to produce an imprint mold which positively profiles the helical groove and the cross of the master mold. The imprint mold is positioned in a blank nut and a thermal set resin is supplied to radial openings formed in the blank nut which subsequently hardens into a plug with an internal crossover channel like that of the master mold.

3 Claims, 6 Drawing Figures

MANUFACTURE OF BALL NUT WITH INTERNAL CROSSOVER PATH FOR BALL RECIRCULATION

This invention relates to ball nut and screw assemblies and more particularly to a new and improved method of manufacture of a nut for a ball nut and screw assembly featuring internal ball crossovers molded directly into the nut.

Ball nut and screw assemblies such as exemplified in U.S. Pat. No. 4,148,226 issued Aug. 10, 1979 have been employed in a wide range of applications to smoothly convert rotary input into linear travel with high efficiency. In these assemblies the nut is rotatably mounted on the screw by a train of balls which operate in an endless path including a helical ball channel formed by the nut and screw. Some of these ball nut and screw assemblies employ ball deflectors disposed axially on opposite ends of the ball nut with special end grooves and ball pickup devices for guiding the balls exiting from the helical ball channel into a return passage provided in the nut for subsequent feedback into the helical ball channel. While such constructions have proven to be highly effective, their use is limited especially where small or miniature type ball nut and screw assemblies are required since there is little or no space in the nut for the return passage. This problem has been solved by other ball nut and screw designs with the provision of a special crossover insert radially mounted within the nut. Each insert has an internal ball crossover path or channel connecting adjacent turns of the helical channel formed by the ball nut and screw to provide a closed circuit for circulation of a train of balls mounted therein. Preferably, several longitudinally spaced closed circuits are provided along the axis of the nut for accommodating additional ball trains to reduce lash and improve smoothness of operation. With such designs, longitudinally extended return passages have been eliminated and the size of the ball nut can be accordingly reduced.

Generally such crossover inserts are installed in cylindrical openings 90 degrees to the rotational axis of the nut. Also, these inserts have involved precision machining and finishing operations to provide a smooth path or channel interconnecting adjacent turns of the helical channel to provide the closed circuit. After their fabrication, such crossover inserts, generally being quite small, were difficult to handle and assemble precisely in the ball nut. Furthermore, many inserts had to be secured into place by special fastenings to ensure proper operation of the ball nut and screw assembly.

In contrast to the prior ball nut and screw assemblies and methods of manufacture, this invention provides a new and improved ball nut and screw construction and a new and improved method of manufacturing a ball nut with a molded internal crossover. In this invention a metallic ball nut with one or more machined metallic ball crossover inserts mounted therein is selected for use as a master mold. Each crossover insert has a precise three-dimensional channel cut into the internal face thereof to provide a track to feed the balls between adjacent turns of the internal helical groove of the nut. After the metallic inserts are properly installed, the ball nut is preferably bifurcated or cut longitudinally to provide a master mold which includes the crossover channels. The master mold is then mounted into a suitable fixture or otherwise supported and a silicone material is introduced into the master mold and allowed to harden to thereby form a silicone imprint mold which includes a positive profile of a portion of the helical groove of the nut and the ball crossover channels properly aligned therewith. The imprint mold is removed from the master mold and inserted into a metal blank nut having internal helical grooves which are the same as those of the master. This blank also has predetermined and accurately sized radial holes 90 degrees to the rotational axis of the nut which correspond to the holes formed in the master for the metallic crossover inserts. The silicone imprint mold is positioned in the blank so that the profile of the crossover channels are aligned in the radial holes. With the imprint mold secured in place, a liquid thermal set resin is employed to fill the radial holes and flow onto the profile of the crossover channels. This resin is allowed to harden as a permanent plug in the radial holes to form crossover members with internal crossover channels which mirror those of the master mold. After the crossover members have hardened, the silicone mold is readily removed from the nut so that the nut can be assembled with a screw and trains of balls in a conventional manner. The silicone imprint mold is subsequently used with a second ball nut blank to make molded crossover plug for a second assembly.

With this invention, the molded internal ball return plugs provide a reduction in cost since machined crossover inserts other than that of the master mold are eliminated. The match of the ball nut grooves and the internal crossover channel of the insert will always be consistent and matched to precisely reflect the original matching of the ball nut and crossover channel of the master. The thermal set material will adhere to the walls of the radial openings to eliminate the need for auxiliary external type locking used to prevent the prior inserts from moving or rotating axially out of the ball nut. The resiliency of the resin material for the crossover channel of this invention will reduce noises and rough operation generated by circulating balls traversing the crossover channel of some prior systems and particularly those using the metal ball crossover devices. Once a master is made, economical quantity production of ball nuts with molded crossovers is provided featuring precisely positioned crossover channels.

These and other features, objects and advantages of this invention will be more apparent from the following detailed description and drawings in which.

Figure 1:
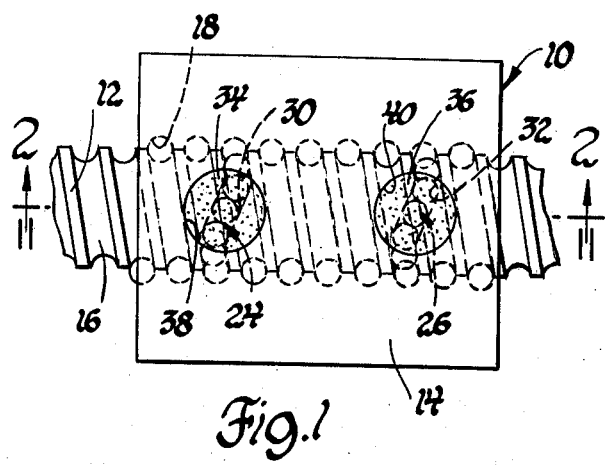
FIG. 1 is a side elevational view of a portion of a ball nut and screw assembly with the ball train and crossovers made in accordance with the present invention.

Turning now in greater detail to FIG. 1 of the drawings, there is shown a ball nut screw assembly 10 comprising an elongated screw 12 rotatably mounted in a cylindrical nut 14 so that relative rotation of the nut and screw results in the relative linear movement of these two components. The screw has a helical groove 16 that cooperates with a corresponding helical groove 18 in the ball nut 14 to form a helical ball channel sized to accommodate spherical balls 20 and 22 forming ball trains 24 and 26 which drivingly interconnect the ball nut 14 and screw 12. Adjacent turns of the helical ball channel are interconnected to one another adjacent to opposite ends of the ball nut by crossover passages 30 and 32 formed in the interior wall of crossover plugs 34 and 36 to provide closed circuits for the ball trains 24 and 26. The plugs are molded from a thermal set resin injected into radially extending openings 38 and 40 bored through the walls of the ball nut. The resinous crossover plugs adhere to the walls of the openings 38 and 40 after curing so that no additional fastening means is needed to maintain the plugs in position. Furthermore, the plugs possess high resiliency and high yield strength properties to provide a quiet ball recirculation system with a long service life.

Figure 2:
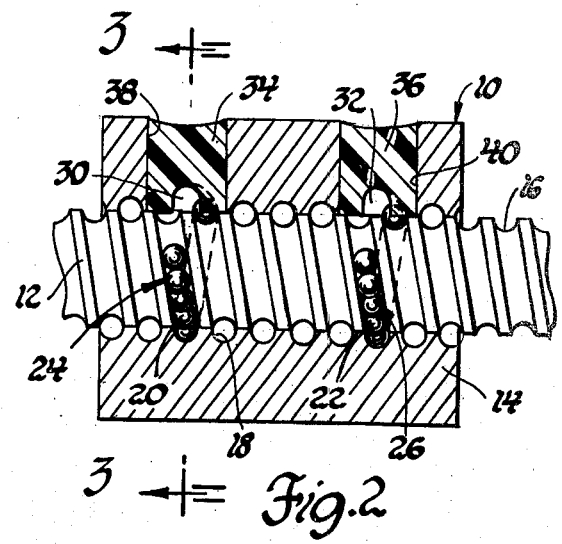
FIG. 2 is a view taken along lines 2—2 of FIG. 1 as viewed in the direction of the indicator arrows showing the thermal set resin ball return system employed in this invention.

The crossover passages have a lead opposite to the lead of the helical ball groove channel provided by the grooves in the ball nut and screw as shown in FIGS. 1 and 2. When the screw 12 is rotated in either direction, the balls of each train 24 and 26 will be smoothly transferred into the adjacent turn of the helical channel by the crossover passages 30 and 32. With the adjacent turns of the helical channel interconnected by the crossover passages, closed circuits for the ball trains drivingly interconnecting the ball nut and screw are provided.

In this invention, an improved method of manufacture of ball nuts with crossovers is provided. Initially a ball nut and screw assembly similar to that of FIGS. 1 and 2 but having metal crossover inserts instead of the thermal set resin crossover plugs is carefully selected. The metallic inserts of the selected nut have crossover paths corresponding to the crossover paths 30 and 32 of their counterparts which are accurately finished and installed with a high degree of precision to insure smooth circulation of the balls.

Figure 4:
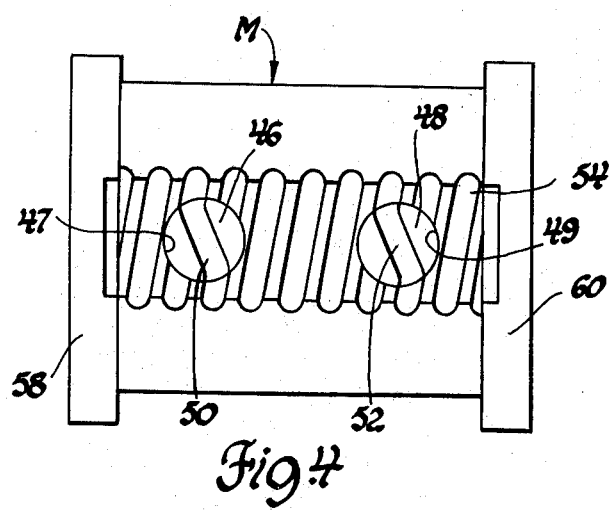
FIG. 4 is a top plan view of a longitudinal section of the nut as cut along center line C—C FIG. 3 to provide a master mold with the mold being retained in fixture members.
Figure 3:
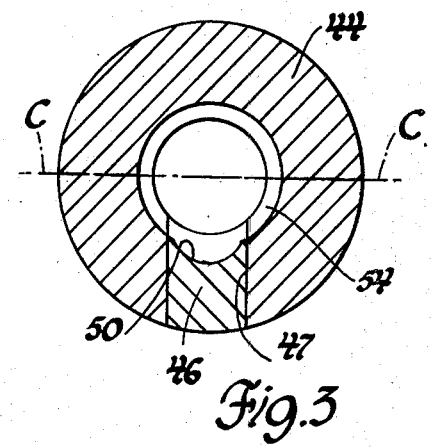
FIG. 3 is a view taken along lines 3—3 of FIG. 2 turned 180 degrees with the screw and balls removed and with metal ball crossovers in place of the thermal set resin crossovers of FIG. 2 to provide a master nut for this invention.
Figure 5:
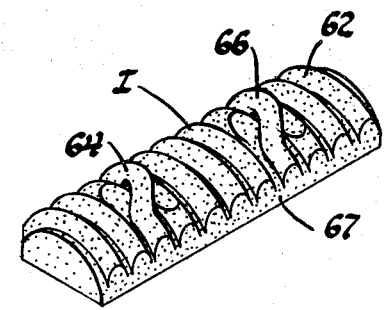
FIG. 5 is a perspective view of a positive imprint mold of the helical ball groove and the crossover channels made from the master mold of FIG. 4.

FIG. 3 illustrates a cross section of a selected ball nut 44 which corresponds to the ball nut 14 of FIGS. 1 and 2. The selected ball nut 44 has a pair of cylindrical metal inserts 46 and 48 providing in radial openings 47 and 49 and these inserts have internal crossover passages 50 and 52 machined therein to provide a smooth pathway interconnected adjacent turns of the helical groove 54 formed in the selected ball nut. The selected ball nut is cut along the center lines C—C of FIG. 3 to produce a semicylindrical master mold M shown in FIG. 4. The master mold M is mounted into fixtures 58 and 60 and is positioned so that the helically grooved interior of the mold faces upwardly for reception of a quantity of silicone which is poured into the cavity provided by the master mold. The silicone solidifies into an imprint mold I shown in FIG. 5. This imprint mold has a positive helical profile 62 of the groove 54 of the master mold as well as positive profiles 64, 66 of the crossover passages 50 and 52 which interconnect the selected turns of the helical groove 54. After the imprint mold hardens, it is removed from the master mold and has its side edges trimmed as at 67 to reduce its width.

Figure 6:
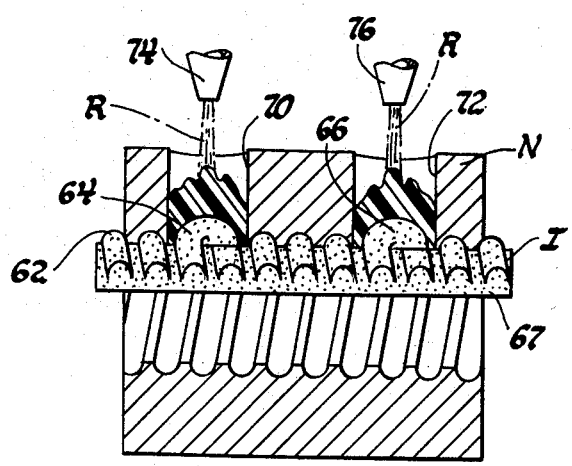
FIG. 6 is a cross sectional view of a ball nut blank and the imprint mold of FIG. 5 inserted therein illustrating the injection of a thermal set resin into radial holes for molding crossover plugs in the nut.

FIG. 6 illustrates the insertion of the imprint mold I into a production nut N which corresponds to the nut 14 of FIG. 1 prior to the provision of the crossover plugs. After being axially inserted through the nut, the imprint mold is brought upwardly into the FIG. 6 position in which the helical profile 62 of the imprint mold fits into the corresponding helical groove of the production nut and in which the crossover profiles 64 and 66 are radially aligned in the cylindrical openings 70 and 72 of the production nut N which correspond to the radial openings 38 and 40 of the FIGS. 1 and 2 construction. Once this alignment has been made and with the production nut and imprint mold secured in the FIG. 6 position, a predetermined quantity of a liquid thermal set resin R is fed into the openings 70 and 72 through supply nozzles 74 and 76. Once the radial openings 70, 72 are filled, the supply of the thermal set resin is terminated and the resin is allowed to cure. After curing, the silicone imprint mold I is easily removed from the nut by moving it downwardly and axially withdrawing it so that a nut such as nut 14 of FIGS. 1 and 2 is formed. With this nut construction, a screw such as screw 12 can be axially inserted into the nut and supplied with ball trains to drivingly interconnect the nut and screw.

With this invention, nut manufacture is economical and easily repeatable with a high degree of accuracy. Furthermore, there is improved smoothness of operation of ball nut and screw assemblies using the ball nut made by the method of this invention, especially with miniature sized units. With the molded resinous inserts, the crossover path is accurately aligned with the helical grooves for the proper flow of the balls when the unit is assembled. The match of the ball nut grooves and the internal return grooves will always be consistent and precisely match as the match of the master nut and its metallic insert. Since the resinous material will adhere to the cylindrical wall of the radial openings in the ball nut, the need for an external type of locking to prevent the insert from rotating or moving axially from the ball nut is eliminated. The resiliency of the resinous crossover will eliminate clicking or roughness found in some metal return systems. Once the imprint mold is made, ball nut crossover plugs can be poured quickly with assured repeatability, with great accuracy and with good economy. If needed, the ball nuts having worn crossover plugs can be easily remanufactured with new molded crossover plugs.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A method of making a ball nut for a ball nut and screw assembly with an internal ball return crossover comprising the steps of providing a master ball nut with an internal helical groove therein for a train of balls and with a radial opening in the wall of said ball nut which intersects the longitudinal axis of said ball nut and two adjacent turns of said groove, installing an insert into said opening having crossover channel for said balls internally formed therein to provide a ball path which interconnects said two adjacent turns of said groove, using said master ball nut and said insert as a master mold, molding an imprint mold from said master mold that profiles a portion of said helical groove and said ball crossover channel, removing said imprint mold from said master mold, inserting said imprint mold into a blank ball nut that has an internal helical thread groove and a radial opening that conforms to the helical groove and radial opening of said master mold, supplying a plastic material into said radial opening of said blank ball nut while the profile of the helical groove formed on said imprint mold engages the helical groove of said blank ball nut and while the profile of the ball crossover channel is disposed in the inner end of said radial opening, hardening said plastic material to thereby form a plug with a ball crossover channel corresponding to the crossover channel of said master insert, and removing said imprint mold from said blank ball nut.

2. A method of making a ball nut for a ball nut and screw assembly with an internal ball return crossover comprising the steps of providing a master ball nut with an internal helical groove therein for a train of balls and with a radial opening in the wall of said ball nut which intersects the longitudinal axis of said ball nut and two adjacent turns of said groove, installing an insert into said opening having an internal crossover channel for said train of balls which interconnects said two adjacent turns of said groove, dividing said master ball nut and said insert to form a master mold, feeding a material into said master mold to form an imprint mold that profiles a portion of said helical groove and said ball crossover channel, removing said imprint mold from said master mold, inserting said imprint mold into a blank ball nut that has an internal helical groove and a radial opening that conforms to the helical groove and radial opening of said master mold, supplying a plastic material into said radial opening of said blank while the profile of the helical groove formed on said imprint mold engages the helical groove of said blank and the profile of the ball crossover channel is disposed in the inner end of said radial opening, hardening said plastic material to thereby form a plug in said opening with a ball crossover channel that corresponds to the crossover channel of said master insert, and removing said imprint mold from said blank ball nut.

3. A method of making a ball nut for a ball nut and screw assembly with an internal ball return crossover comprising the steps of providing a master ball nut with an internal helical groove therein for a train of balls and with a radial opening in the wall of said ball nut which intersects the longitudinal axis of said master ball nut and two adjacent turns of said groove, installing an insert into said opening having an internal crossover channel for said balls to provide a ball path which interconnects said two adjacent turns of said groove, longitudinally dividing said master ball nut and using a divided part as a master mold, molding an imprint mold from said master mold that profiles a portion of said helical groove and profiles said ball crossover channel of said master mold, removing said imprint mold from said master mold, inserting said imprint mold into a blank ball nut that has an internal helical thread groove and a radial opening that conforms to the helical groove and radial opening of said master ball nut, supplying a plastic material into said radial opening of said blank ball nut while the profile of the helical groove formed on said imprint mold engages the helical groove of said blank ball nut and the profile of the ball crossover channel projects into the inner end of said radial opening, hardening said plastic material to thereby form a plug with a ball crossover channel that corresponds to the crossover channel of said master insert, and removing said imprint mold from said nut.

* * * * *